(12) United States Patent
Bacon, Jr.

(10) Patent No.: US 11,131,336 B2
(45) Date of Patent: Sep. 28, 2021

(54) DUAL-USE NUT-CAGE SYSTEM

(71) Applicant: Bell Helicopter Textron Inc., Fort Worth, TX (US)

(72) Inventor: Bruce Bennett Bacon, Jr., Euless, TX (US)

(73) Assignee: Textron Innovations Inc., Providence, RI (US)

( * ) Notice: Subject to any disclaimer, the term of this patent is extended or adjusted under 35 U.S.C. 154(b) by 330 days.

(21) Appl. No.: 16/398,122

(22) Filed: Apr. 29, 2019

(65) Prior Publication Data

US 2019/0331158 A1 Oct. 31, 2019

Related U.S. Application Data

(60) Provisional application No. 62/664,218, filed on Apr. 29, 2018.

(51) Int. Cl.
*F16B 37/04* (2006.01)

(52) U.S. Cl.
CPC ............ *F16B 37/044* (2013.01); *F16B 37/04* (2013.01)

(58) Field of Classification Search
CPC ........ F16B 37/04; F16B 37/044; F16B 39/08; F16B 39/10; Y10S 411/97
USPC .......................... 411/111, 112, 190, 191, 432
See application file for complete search history.

(56) References Cited

U.S. PATENT DOCUMENTS

| 2,243,923 | A | * | 6/1941 | Swanstrom | ............ | B21D 39/03 411/113 |
| 2,815,789 | A | * | 12/1957 | Hutson | ................ | F16B 37/044 411/111 |
| 3,123,120 | A | * | 3/1964 | Grimm et al. | ......... | F16B 37/044 411/111 |
| 3,217,585 | A | * | 11/1965 | Munse | .................. | F16B 37/044 411/432 |
| 3,695,324 | A | * | 10/1972 | Gulistan | ............... | F16B 33/002 411/111 |
| 4,695,212 | A | * | 9/1987 | Berecz | .................. | F16B 37/046 411/85 |
| 4,895,484 | A | * | 1/1990 | Wilcox | ................. | F16B 37/044 411/103 |

(Continued)

OTHER PUBLICATIONS

Trang, N., "Assembly, Nut, Self-Locking, Plate-Two Lug, Floating", Part No. BFN1791C, Bristol Industries, Brea, California, Approved date Oct. 17, 1982—Revised date Aug. 13, 2014, 2 pages.

(Continued)

*Primary Examiner* — Roberta S Delisle
(74) *Attorney, Agent, or Firm* — Lightfoot & Alford PLLC

(57) ABSTRACT

A nut-cage system has a nut cage having a base plate and two wings extending from the base plate on opposite sides of the base plate. The wings and base plate form a U-shape, each wing having a slot formed therein, and a fastener aperture is formed through the base plate. A snap-in threaded nut has a pair of tabs extending from a base thereof. A clip-retained threaded nut has a flange extending from a base thereof and is configured for use with a retainer clip. The slots are sized for receiving the tabs of the snap-in nut when the snap-in nut is installed in the nut cage and for receiving portions of the retainer clip when the clip-retained nut and retainer clip are installed in the nut cage, thereby retaining a selected one of the nuts within the cage.

10 Claims, 4 Drawing Sheets

(56) References Cited

U.S. PATENT DOCUMENTS

| | | | | |
|---|---|---|---|---|
| 5,137,406 | A | * | 8/1992 | Cosenza ................ F16B 2/005 411/113 |
| 5,146,668 | A | * | 9/1992 | Gulistan ................ B21K 1/70 29/525 |
| 5,193,868 | A | * | 3/1993 | O'Toole ................ E05B 85/045 292/341.15 |
| 5,468,104 | A | * | 11/1995 | Reid ..................... F16B 21/186 411/113 |
| 6,474,917 | B2 | * | 11/2002 | Gauron ................ F16B 37/044 411/112 |
| 6,918,725 | B2 | * | 7/2005 | Gauron ................ F16B 37/043 411/112 |
| 7,114,900 | B2 | * | 10/2006 | Toosky ................ B21K 25/00 411/108 |
| 7,591,622 | B2 | * | 9/2009 | de Jesus ............... F16B 37/044 411/108 |

OTHER PUBLICATIONS

National Aerospace Standard, "Nut—Self-Locking Counterbore Replaceable Element", Fed. Sup Class 5310, NAS 1794, Aerospace Industries Association of America, Inc., Washington, D.C., Approval date Nov. 1978—Revision Dates Jul. 2001 and Oct. 2003, 3 pages.

* cited by examiner

DUAL-USE NUT-CAGE SYSTEM

CROSS-REFERENCE TO RELATED APPLICATIONS

This application claims priority to U.S. Provisional Patent Application No. 62/664,218, filed on 29 Apr. 2018 by Bruce Bennett Bacon, Jr., and titled "Dual-Use Nut-Cage System," the disclosure of which is incorporated by reference in its entirety.

STATEMENT REGARDING FEDERALLY SPONSORED RESEARCH OR DEVELOPMENT

Not applicable.

BACKGROUND

Nut cages are used to retain nuts where it is difficult to access the nut during assembly of components.

FIGS. 1 and 2 illustrate a prior-art nut-cage assembly 101, comprising a nut cage 103 and a nut 105. Nut cage 103 comprises a generally rectangular and planar base plate 107 and wings 109, 111 extending in the same direction from opposite sides of plate 107. Plate 107 has an inner surface 113 and an outer surface 115. A fastener aperture 117 is formed in plate 107 between wings 109, 111, and a rivet aperture 119 is formed in plate 107 a selected distance from aperture 119. A rectangular slot 121 is formed in each wing 109, 111 adjacent plate 107, slots 121 having a height h1 and width w1.

Nut 105 comprises a generally cylindrical body 123 having a threaded aperture 125 for receiving a threaded fastener (not shown). A flange 127 extends radially from the base of body 123, and rectangular tabs 129 extend from flange 127 on opposite sides of body 123. Tabs 129 are sized for insertion into slots 121 for retaining nut 105 within cage 103. A grommet 131 has a disk-shaped base 133 and a flange 135 formed adjacent inner surface 113 of plate 107 by deforming a coaxial cylindrical portion of grommet 131 after insertion through an aperture 137 of an assembly material, such as skin 139, and through fastener aperture 117 of plate 107. Grommet 131 has a fastener aperture 141, which allows a fastener to passthrough grommet 131, skin 139, and plate 107 and into aperture 125 of nut 105 for engaging the threads therein.

Cage 103 is typically installed on a thin material, such as the skin of an aircraft, and used to retain nut 105 adjacent a hole formed in the material, allowing a fastener to be fastened to nut 105 without requiring access to nut 105. While shown as adjacent outer surface 115 of plate 107, base 133 will be spaced from outer surface 115 b the thickness of the material to which cage 103 is attached. A rivet (not shown) will also be used to attach cage 103 to the material through rivet aperture 119 to prevent rotation of cage 107 about grommet 131. To install nut 105, a tool is used to snap nut 105 into cage 103 by pressing tabs between wings 109, 111, deforming wings 109, 111 sufficiently to allow tabs 129 to enter slots 121.

FIGS. 3 and 4 illustrate a prior-art nut-cage assembly 201, comprising a nut cage 203 and a nut 205. Nut cage 203 comprises a generally rectangular and planar base plate 207 and wings 209, 211 extending in the same direction from opposite sides of plate 207. Plate 207 has an inner surface 213 and an outer surface 215. A fastener aperture 217 is formed in plate 207 between wings 209, 211, and a rivet aperture 219 is formed in each end of plate 207 a selected distance from aperture 219. A rectangular slot 221 is formed in each wing 209, 211 adjacent plate 207, slots 221 having a height h2 and width w2, the upper edge of slot 221 being positioned above plate 207 by a height h3.

Nut 205 comprises a generally cylindrical body 223 having a threaded aperture 225 for receiving a threaded fastener (not shown). A generally rectangular flange 227 extends from the base of body 223 and is adjacent inner surface 213 when nut 205 is installed in cage 203. A generally C-shaped retainer clip 229 is sized for insertion of portions of clip 229 into slots 221 above flange 227 for retaining nut 205 within cage 203.

As with cage 103, cage 203 is typically installed on a thin material, such as the skin of an aircraft, and used to retain nut 205 adjacent a hole formed in the material, allowing a fastener to be fastened to nut 205 without requiring access to nut 205. Rivets (not shown) will be used to attach cage 203 to the material through rivet apertures 219. To install nut 205, nut 205 is placed between wings 209, 211 with flange 227 adjacent inner surface 213, and then clip 229 is installed by applying pressure to the open ends of clip 229 to compress clip 229 to a width allowing insertion between wings 209, 211 and into slots 221 above flange 227.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The nut-cage system of this disclosure improves upon the prior-art assemblies described above by providing a common nut cage that will accept nuts that are snapped into the nut cage and nuts retained in the cage by clips. This allows for the use of the same nut cage throughout an entire assembly, such as, for example, an aircraft, or at least throughout an entire section of an assembly. In addition, the use of the nut-cage system of this disclosure is extremely advantageous when nut cages are used in areas that make it difficult or impossible to use a tool for one or the other of the nut designs, thereby eliminating the need to switch between types of nut cages. The nut-cage system according to this disclosure is installed and used in the same manner as described above.

FIGS. 5 through 8 illustrate a nut-cage system according to this disclosure and allowing a nut cage 301 to use snap-in nut 303 and clip-retained nut 305.

Figure 1:
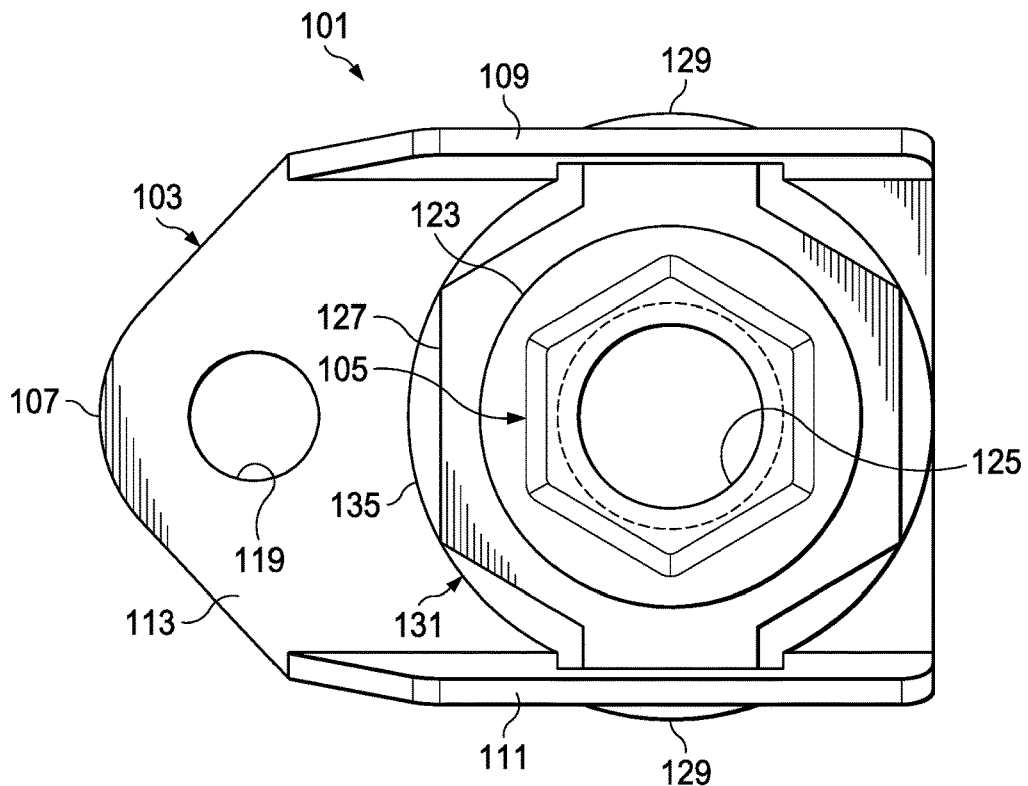
FIG. 1 is a top view of a prior-art nut-cage assembly.
Figure 2:
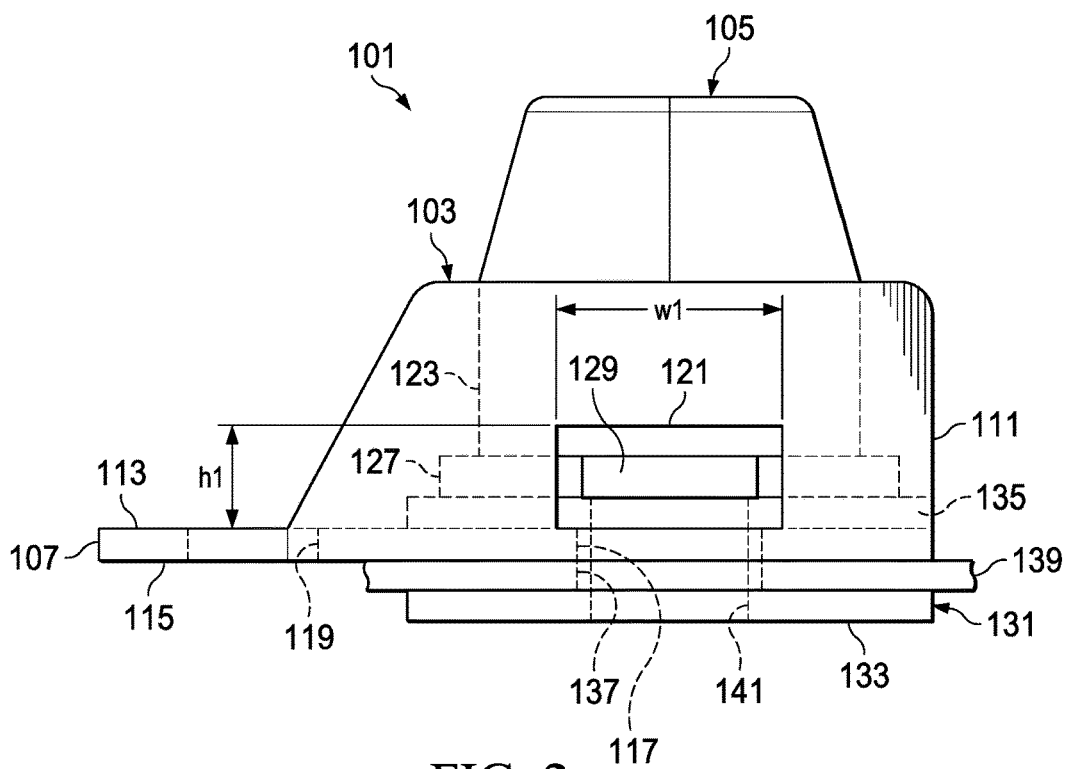
FIG. 2 is a side view of the assembly of FIG. 1.
Figure 3:
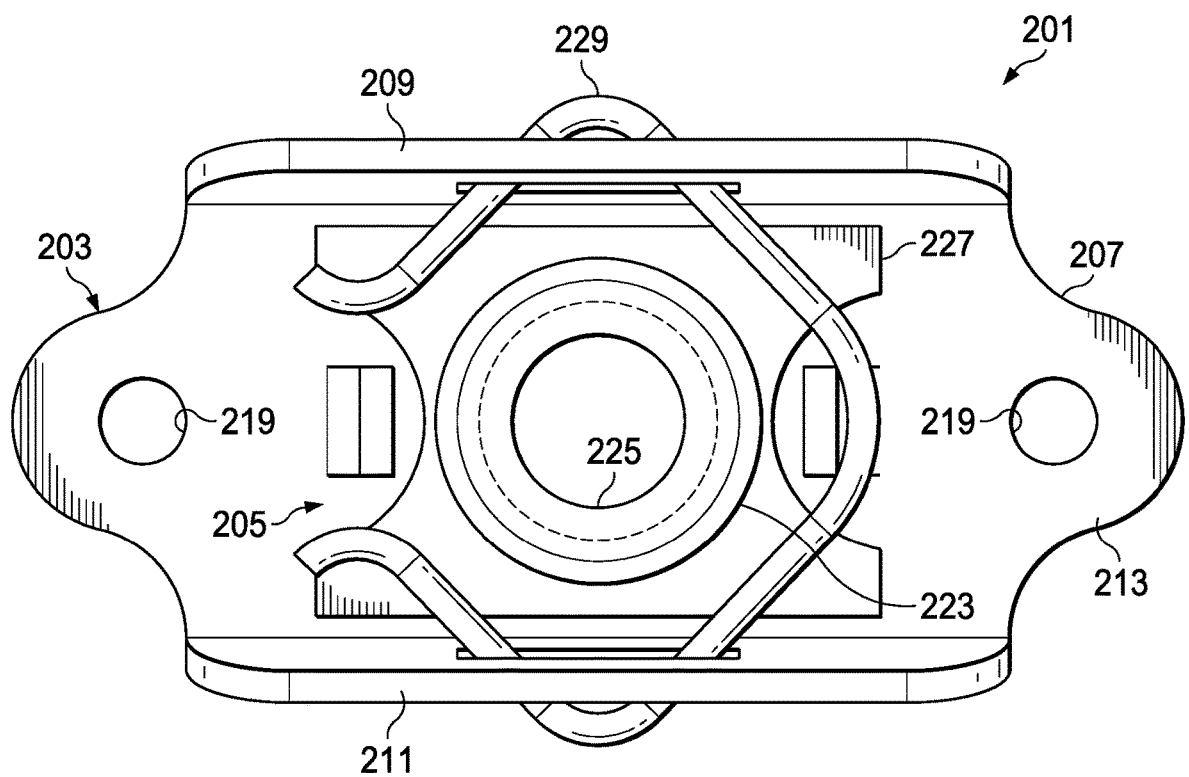
FIG. 3 is a top view of another prior-art nut-cage assembly.
Figure 4:
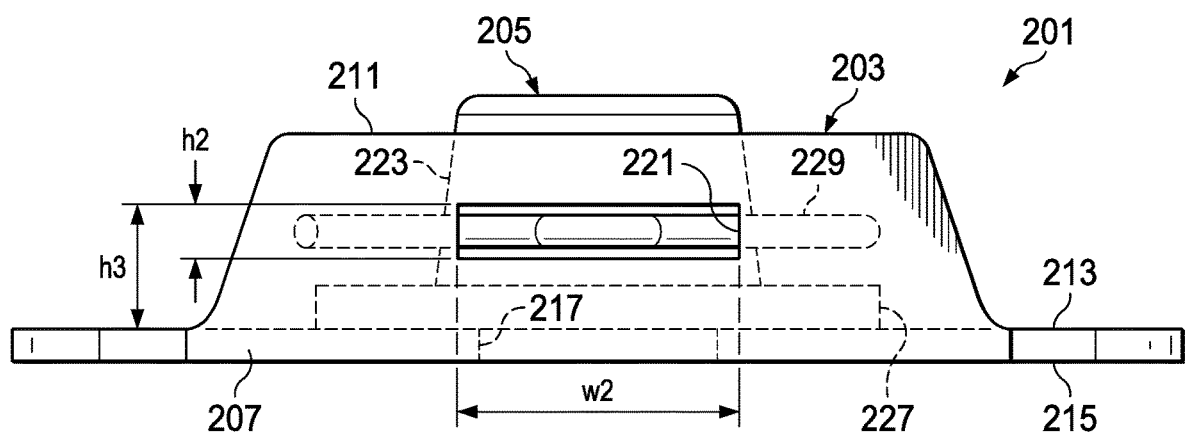
FIG. 4 is a side view of the assembly of FIG. 3.
Figure 5:
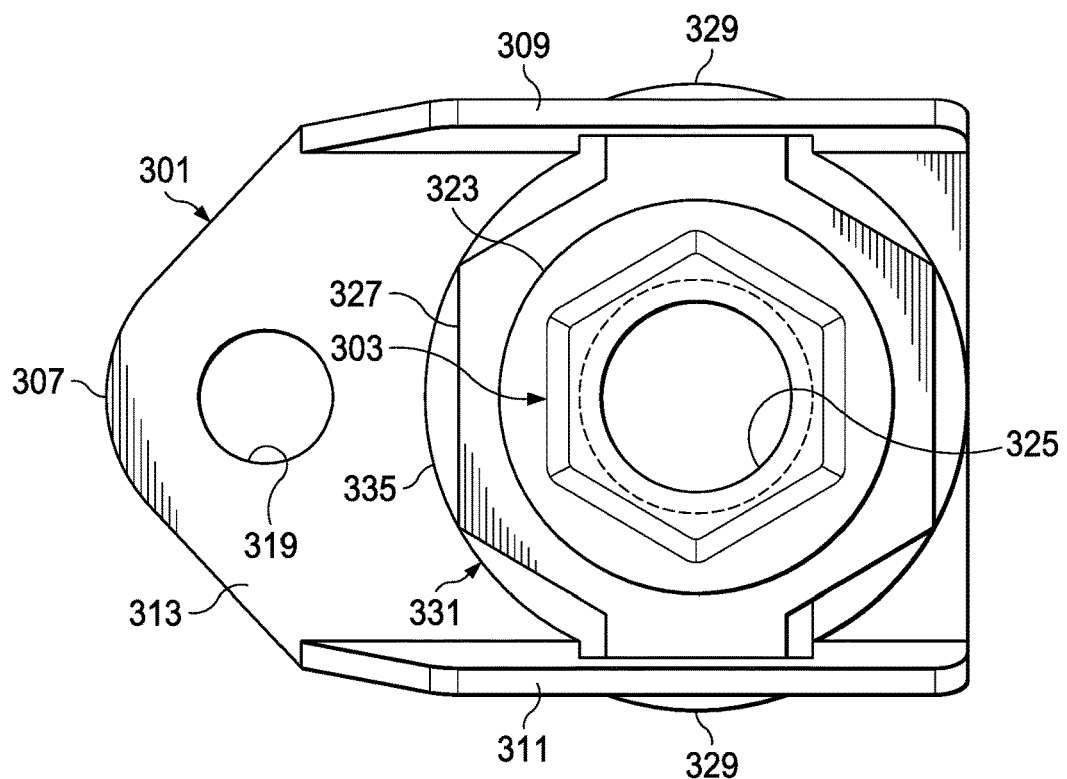
FIG. 5 is a top view of a nut-cage assembly of a system according to this disclosure.
Figure 6:
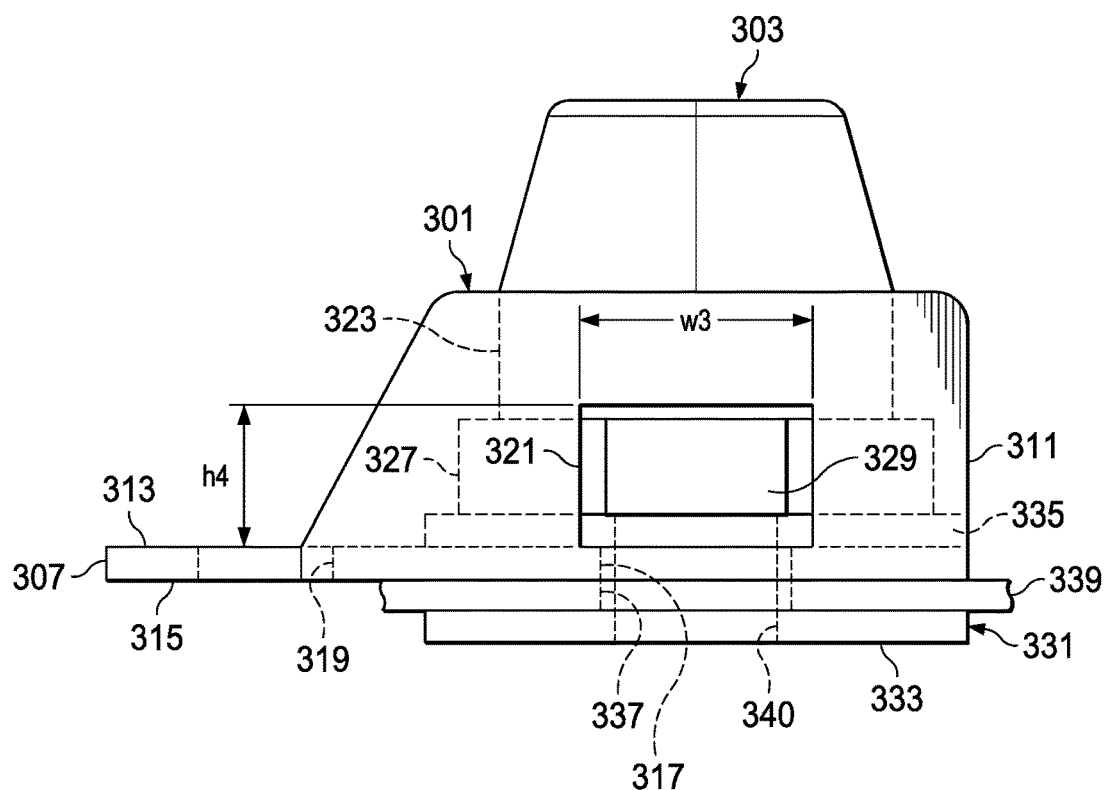
FIG. 6 is a side view of the assembly of FIG. 5.

FIGS. 5 and 6 illustrate nut cage 301, which is constructed similarly to cages 103, 203, described above. Nut cage 301 comprises a generally rectangular and planar base plate 307 and wings 309, 311 extending in the same direction from opposite sides of plate 307, base plate 307 and wings 309, 311 generally forming a U-shape configuration. Plate 307 and wings 309, 311 are shown having a particular configuration, such as a selected thickness, height, width, angle, and position, though other configurations may be used. Plate 307 has an inner surface 313 and an outer surface 315, and a fastener aperture 317 is formed in plate 307 between wings 309, 311. In the embodiment shown, one rivet aperture 319 is formed in plate 307 a selected distance from aperture 317, though other embodiments of nut cage 301 may have additional rivet apertures 319 located at other locations on plate 307. A rectangular slot 321 is formed in each wing 309, 311 generally adjacent plate 307, slots 321 having a height h4 and width w3. Though shown as rectangular, other embodiments may have slots 321 with another shape or configuration, though slots 321 will always be sized and positioned for use in retaining both nuts 303, 305.

Nut 303 is constructed similarly to nut 105, as described above, with nut 303 comprising a generally cylindrical body 323 having a threaded aperture 325 for receiving a threaded fastener (not shown). A flange 327 extends radially from the base of body 323, and rectangular tabs 329 extend from flange 327 on opposite sides of body 323. Tabs 329 are sized for insertion into slots 321 for retaining nut 303 within cage 301. A grommet 331, constructed similarly to grommet 131, has a disk-shaped base 333 and a flange 335 formed adjacent inner surface 313 of plate 307 by deforming a cylindrical portion of grommet 331 after insertion through an aperture 337 of an assembly material, such as skin 339, and through fastener aperture 317 of plate 307. Grommet 331 has a fastener aperture 340, which allows a fastener to pass through grommet 331, skin 339, and plate 307 and into aperture 325 of nut 303 for engaging the threads therein.

To allow for proper use with slots 321, which are taller than slots 121 of nut cage 103, tabs 329 (and optionally flange 327) are taller than tabs 129 of nut 105. This allows tabs 329 (when stacked on flange 335 of grommet 331) to be captured by slots 321 to a degree substantially similar to the amounts that tabs 129 are captured by slots 121, preventing excessive translation or excessive rotation of nut 303 relative to nut cage 301 when inserting a fastener into nut 303.

Figure 7:
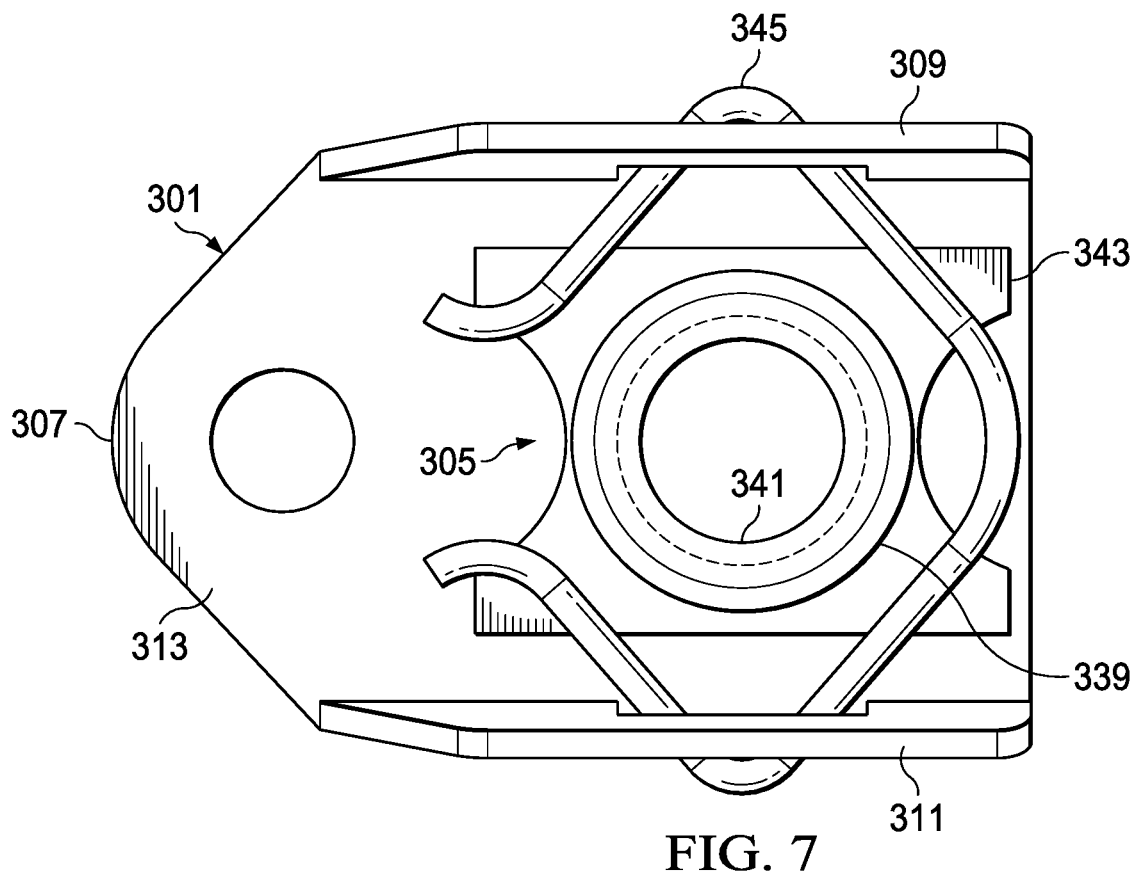
FIG. 7 is a top view of another nut-cage assembly of the system according to this disclosure, the assembly using the nut cage of FIG. 5.
Figure 8:
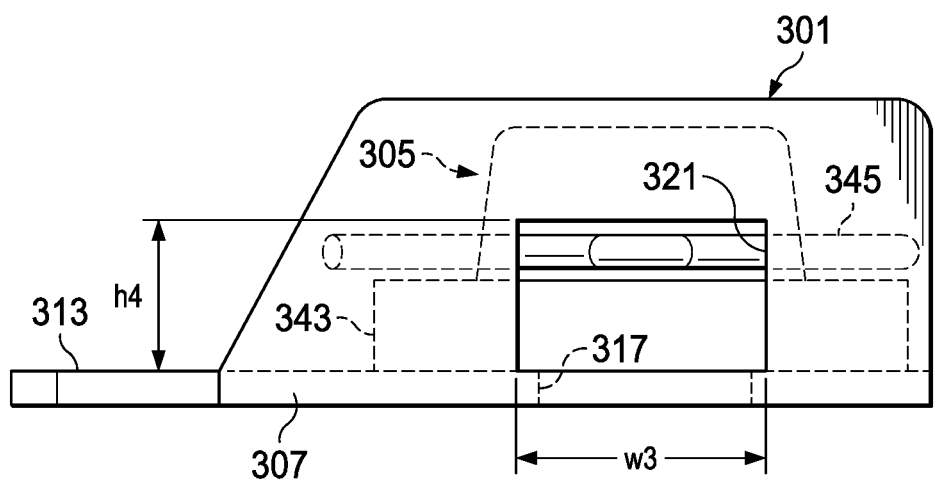
FIG. 8 is a side view of the assembly of FIG. 7.

FIGS. 7 and 8 illustrate nut cage 301 being used to retain nut 305. Nut 305 is constructed similarly to nut 205, as described above, and comprises a generally cylindrical body 339 having a threaded aperture 341 for receiving a threaded fastener (not shown). A generally rectangular flange 343 extends from the base of body 339 and is adjacent inner surface 313 when nut 305 is installed in cage 301. A generally C-shaped retainer clip 345, like clip 229, is sized for insertion of portions of clip 345 into slots 321 above flange 343 for retaining nut 305 within cage 301. The combined height of flange 343 and clip 345 prevent excessive translation or excessive rotation of nut 305 relative to nut cage 301 when inserting a fastener into nut 305.

While shown as having particular configurations and sizes for nuts, clips, and slots, it should be understood that other configurations and sizes may be utilized. For example, use of off-the-shelf nuts and clips, such as those of the NAS1794 and NAS1795 specifications, could reduce costs and allow for use of components already in inventory.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A nut-cage system, comprising:
 a nut cage having a base plate and two wings extending from the base plate on opposite sides of the base plate, the wings and base plate forming a U-shape, each wing having a slot formed therein, a fastener aperture being formed through the base plate;
 a snap-in threaded nut having a pair of tabs extending from a base thereof;
 a clip-retained threaded nut having a flange extending from a base thereof;
 a retainer clip; and
 a grommet having a base and a coaxial cylindrical portion extending from the base, an end of the cylindrical portion configured to be deformed for forming a flange adjacent an inner surface of the base plate;
 wherein the slots are sized for receiving the tabs of the snap-in nut when the snap-in nut is installed in the nut cage and for receiving portions of the retainer clip when the clip-retained nut and retainer clip are installed in the nut cage, thereby retaining a selected one of the nuts within the cage.

2. The nut-cage system of claim 1, further comprising:
at least one aperture in the base plate spaced from the fastener aperture and adapted for use in fastening the nut cage to an assembly component.

3. The nut-cage system of claim 1, wherein the height of the tabs of the snap-in nut is approximately equal to the combined height of the flange of the clip-retained nut and the clip.

4. The nut-cage system of claim 1, wherein the tabs are rectangular.

5. The nut-cage system of claim 1, wherein the slots are rectangular.

6. A method of positioning a threaded nut during assembly, comprising:
  (a) installing a nut cage on an assembly component, the nut cage having a base plate and two wings extending from the base plate on opposite sides of the base plate, the wings and base plate forming a U-shape, each wing having a slot formed therein, a fastener aperture being formed through the base plate;
  (b) installing a nut into the nut cage, the nut being either a snap-in threaded nut having a pair of tabs extending from a base thereof for extending into the slots of the nut cage for retaining the snap-in nut or a clip-retained threaded nut having a flange extending from a base thereof, a retainer clip engaging the flange and extending into the slots of the nut cage for retaining the clip-retained nut;
  (c) providing a grommet having a base and a coaxial cylindrical portion extending from the base, an end of the cylindrical portion configured to be deformed for forming a flange adjacent an inner surface of the base plate.

7. The method claim 6, further comprising:
  (d) fastening the nut cage to the assembly component using at least one aperture in the base plate spaced from the fastener aperture.

8. The method of claim 6, wherein the height of the tabs of the snap-in nut is approximately equal to the combined height of the flange of the clip-retained nut and the clip.

9. The method of claim 6, wherein the tabs are rectangular.

10. The method of claim 6, wherein the slots are rectangular.

\* \* \* \* \*